(12) United States Patent
Paysan et al.

(10) Patent No.: US 12,158,926 B2
(45) Date of Patent: *Dec. 3, 2024

(54) DUAL DOMAIN TRACKING OF TARGET STRUCTURES

(71) Applicant: SIEMENS HEALTHINEERS INTERNATIONAL AG, Steinhausen (CH)

(72) Inventors: Pascal Paysan, Steinhausen (CH); Michal Walczak, Steinhausen (CH); Liangjia Zhu, Palo Alto, CA (US); Toon Roggen, Steinhausen (CH); Stefan Scheib, Steinhausen (CH)

(73) Assignee: SIEMENS HEALTHINEERS INTERNATIONAL AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,794

(22) Filed: Oct. 27, 2023

(65) Prior Publication Data
US 2024/0061908 A1 Feb. 22, 2024

Related U.S. Application Data

(63) Continuation of application No. 17/214,282, filed on Mar. 26, 2021, now Pat. No. 11,829,450.

(51) Int. Cl.
*G06F 18/2415* (2023.01)
*G06N 3/08* (2023.01)
(Continued)

(52) U.S. Cl.
CPC ........... *G06F 18/2415* (2023.01); *G06N 3/08* (2013.01); *G06N 20/00* (2019.01); *G06T 7/0012* (2013.01);
(Continued)

(58) Field of Classification Search
CPC ...... G06F 18/2415; G06N 3/08; G06N 20/00; G06T 7/0012; G06T 11/006; G06T 7/248;
(Continued)

(56) References Cited

U.S. PATENT DOCUMENTS 8,396,248 B2 * 3/2013 Mostafavi ............... G06T 7/285
382/106
10,755,120 B2 * 8/2020 Fu ........................... G06N 3/084
(Continued)

OTHER PUBLICATIONS

International Search Report and Written Opinion on PCT Appl. Ser. No Ser. No. PCT/EP2022/057371 dated Aug. 4, 2022 (15 pages).
(Continued)

*Primary Examiner* — Lewis G West
(74) *Attorney, Agent, or Firm* — FOLEY & LARDNER LLP

(57) ABSTRACT

Embodiments described herein provide for determining a probability distribution of a three-dimensional point in a template feature map matching a three-dimensional point in space. A dual-domain target structure tracking end-to-end system receives projection data in one dimension or two dimensions and a three-dimensional simulation image. The end-to-end system extracts a template feature map from the simulation image using segmentation. The end-to-end system extracts features from the projection data, transforms the features of the projection data into three-dimensional space, and sequences the three-dimensional space to generate a three-dimensional feature map. The end-to-end system compares the template feature map to the generated three-dimensional feature map, determining an instantaneous probability distribution of the template feature map occurring in the three-dimensional feature map.

20 Claims, 10 Drawing Sheets

(51) Int. Cl.
  *G06N 20/00* (2019.01)
  *G06T 7/00* (2017.01)
  *G06T 11/00* (2006.01)
  *G06V 10/46* (2022.01)
  *G06V 10/75* (2022.01)

(52) U.S. Cl.
  CPC .......... *G06T 11/006* (2013.01); *G06V 10/462* (2022.01); *G06V 10/751* (2022.01)

(58) Field of Classification Search
  CPC . G06T 2207/10072; G06T 2207/10116; G06T 2207/20081; G06T 2207/20084; G06T 2207/30096; G06V 10/462; G06V 10/751
  See application file for complete search history.

(56) References Cited

U.S. PATENT DOCUMENTS

| | | | | |
|---|---|---|---|---|
| 10,817,462 | B1* | 10/2020 | Dastidar | G06N 20/00 |
| 11,699,273 | B2* | 7/2023 | Kadambi | G06F 18/2413 |
| | | | | 382/190 |
| 2019/0295305 | A1* | 9/2019 | Yang | G06N 3/044 |
| 2020/0057141 | A1* | 2/2020 | Kim | G01S 13/726 |
| 2020/0285915 | A1 | 9/2020 | Mostafavi et al. | |
| 2021/0192719 | A1* | 6/2021 | Laaksonen | G06N 3/045 |
| 2021/0279971 | A1* | 9/2021 | Wang | G06T 15/04 |
| 2022/0021870 | A1* | 1/2022 | Jiang | H04N 19/172 |
| 2022/0036579 | A1* | 2/2022 | Liang | G06T 7/246 |
| 2022/0138493 | A1* | 5/2022 | Lee | G06V 10/26 |
| | | | | 382/103 |
| 2022/0309686 | A1* | 9/2022 | Song | G06V 10/82 |
| 2023/0070439 | A1* | 3/2023 | Gupta | G06V 10/82 |
| 2023/0186060 | A1* | 6/2023 | Miao | G06N 3/063 |
| | | | | 706/26 |
| 2024/0144011 | A1* | 5/2024 | Cella | G06N 3/08 |

OTHER PUBLICATIONS

Notice of Allowance on U.S. Appl. No. 17/214,282 dated Jul. 19, 2023 (9 pages).

Wang Chuang et al.: "Technical Note: 3D localization of lung tumors on cone beam CT projections via a convolutional recurrent neural network", Medical Physics, vol. 47, No. 3, Mar. 2020 (Mar. 1, 2020), pp. 1161-1166. Retrieved from the internet: URL: https://www.ncbi.nlm.nih.gov/pmc/articles/PMC7067648/.

Ying Xingde et al: "X2CT-GAN: Reconstructing CT from Biplanar X-Rays With Generative Adversarial Networks", 2019 IEEE/CVF Conference On Computer Vision and Pattern Recognition (CVPR), IEEE, Jun. 15, 2019 (Jun. 15, 2019), pp. 10611-10620.

Shuqing Chen et al.: "Automatic multi-organ segmentation in dual-energy CT (DECT) with dedicated 3D fully convolutional DECT networks", Medical Physics, pp. 552-562, Feb. 2020.

Tobias Wiirfl "AI: Deep Learning Computed Tomography", Pattern Recognition Laboratory, Friedrich-Alexander-University, pp. 432-440.

* cited by examiner

DUAL DOMAIN TRACKING OF TARGET STRUCTURES

CROSS-REFERENCE TO RELATED APPLICATIONS

This application is a continuation of U.S. application Ser. No. 17/214,282, filed Mar. 26, 2021, which is incorporated by reference herein in its entirety for all purposes.

TECHNICAL FIELD

This application relates generally to using artificial intelligence modeling to determine a location of a target structure in three-dimensional space.

BACKGROUND

Radiotherapy (radiation-based therapy) is used as a cancer treatment to emit high doses of radiation that can kill cells or shrink a tumor. The target region of a patient's anatomy that is intended to receive radiation (e.g., tumor) is referred to as the planning target volume (PTV). The goal is to deliver enough radiation to the PTV to kill the cancerous cells during the radiotherapy treatment. However, other organs or anatomical regions that are adjacent to, or surrounding, the PTV can be in the way of radiation beams and can receive enough radiation to damage or harm such organs or anatomical regions. These organs or anatomical regions are referred to as organs at risk (OARs). Usually, a physician or a radiologist identifies both the PTV and the OARs prior to radiotherapy using, for example, computed tomography (CT) images, cone beam CT images (CBCT), four-dimensional CT images (e.g., CT images over time), magnetic resonance imaging (MM) images, positron emission tomography (PET) images, ultrasound images, images obtained via some other imaging modality, or a combination thereof. Furthermore, simulation images of the patient's anatomy are obtained (using various imaging modalities discussed herein). The physician or the radiologist may manually mark the PTV and/or the OARs on the simulation images of the patient's anatomy to generate planning images.

In an ideal imaging system, rays of radiation travel along respective straight line transmissions paths from a radiation source, through the patient, to respective pixel detectors of the imaging system to produce projection data. The imaging of the internal structure of the patient (or scanning of the patient) to identify the PTVs and/or OARs results in projection data. Throughout the stages of setting up radiotherapy (e.g., while the patient is being setup, after the patient has been setup, while the patient is being imaged, and/or while the patient is being treated with radiation), the patient's anatomy and specifically the PTV and/or OARs may move. Different imaging modalities may take different amounts of time to complete. During the imaging process, and particularly in imaging processes that take time to complete, the patient may move. In an example, a CBCT scan takes longer than a CT scan. Accordingly, a patient (or the PTV and/or OARs in the patient) is likely to move during (or after) the CBCT scan and before the patient is treated with radiation. The patient's movement during (or after) the CBCT scan may result in an inaccurate indication of the PTV and/or OARs in the patient's body.

Some conventional methods provide mechanisms for determining the location of a single PTV in an image (or tracking the PTV) using the projection scan. However, these methods are limited by heuristically performing pre-processing steps (e.g., enhancing contrast, reducing noise) or heuristically determining a feature, parameter and/or algorithm of PTV tracking. For instance, a user may perform template extraction to manually tune an area of interest (such as a PTV), creating a template image of the area of interest to be used during 3D localization. Manual template extraction may include pre-processing steps such as segmentation, or the generation of structure data (such as PTV data) from the simulation images. The pre-processed template image may be ingested by a system that performs PTV tracking (e.g., determining the position of the PTV in space). However, these conventional methods are undesirable because human error and/or bias, may result in large uncertainty margins associated with PTV and/or OAR tracking. In addition, conventional methods of tracking systems are limited in that they locate a PTV and/or OAR in two-dimensional space.

Further, conventional reconstruction algorithms are limited in that they generally cannot accurately estimate the motion of PTV and/or OARs in cases when the motion of the PTV and/or OARs is slow and the region being imaged has mostly low-contrast features (as is commonly the case with CBCT abdomen imaging). Incorrectly estimating the motion of PTV and/or OARs increases the uncertainty margin associated with the PTV and/or OAR, increasing the likelihood of damaging OARs.

SUMMARY

For the aforementioned reasons, there is a need to create an end-to-end system that automatically and seamlessly tracks and identifies PTV(s) and/or OAR(s). As discussed herein, the target structure tracking system may track PTV(s) and/or OAR(s) in three-dimensional space based on kV projections (or other projections) and/or in three-dimensional space based on two-dimensional projection images over time. Disclosed herein are systems and methods capable of addressing the above-described shortcomings that may provide any number of additional or alternative benefits and advantages. For example, by implementing the systems and methods described herein, a system may reduce the uncertainty margins associated with hand tuned algorithms. Embodiments described herein provide for determining a probability of an instantaneous three-dimensional (3D) location of a target structure (such as various PTVs and/or OARs) using an end-to-end target structure tracking system.

A machine learning model utilized in the end-to-end system described herein may learn during training to extract features from projection data and to select relevant features of the projection based on the ability to determine the location of the PTV and/or OAR structures in 3D space. The machine learning model may predict the 3D position of the target structure based on backprojected features of the acquired 2D projection images. The end-to-end system may also learn during training, an optimal weight for the weighted log-subtraction of dual energy projections based on generating image features that are well suited for predicting the location of the PTV and/or OAR structures. The end-to-end system may also learn during training, a contrast to noise ratio of the structures in 3D space. The end-to-end system may also learn during training, the relevant features and/or segmenting information to be extracted from the simulation (or planning) image based on how well the end-to-end system is suited for determining the location of the PTV and/or OAR structures in 3D space. After being tuned during training, the end-to-end system may be deployed in testing. During inference (sometimes called prediction or testing), the end-to-end target structure tracking system may use the learned relevant features, learned algorithmic weights, learned parameters, and the learned functionality, to produce an accurate probability distribution of the location of a PTV and/or OAR structure in 3D space.

In an embodiment, a computer-implemented method of location prediction using an end-to-end target structure tracking system comprising: executing, by a computer, a machine learning model to extract a set of features from imaging projection data associated with a target structure of a patient's anatomy; executing, by the computer, a reconstruction algorithm to transform the extracted set of features into a set of features in three-dimensional space; executing, by the computer, a recurrent neural network to obtain three-dimensional feature map data associated with the target structure, the recurrent neural network configured to sequence the imaging projection data using the set of features in three-dimensional space; extracting, by the computer, a template feature map from a three-dimensional simulation image, the template feature map comprising the target structure; comparing, by the computer, the template feature map to the three-dimensional image data; and indicating, by the computer, a probability of a three-dimensional point in the template feature map matching a location of a three-dimensional point in the three-dimensional feature map data.

In another embodiment, a system comprising: a server comprising a processor and a non-transitory computer-readable medium containing instructions that when executed by the processor causes the processor to perform operations comprising: execute a machine learning model to extract a set of features from imaging projection data associated with a target structure of a patient's anatomy; execute a reconstruction algorithm to transform the extracted set of features into a set of features in three-dimensional space; execute a recurrent neural network to obtain three-dimensional feature map data associated with the target structure, the recurrent neural network configured to sequence the imaging projection data using the set of features in three-dimensional space; extract a template feature map from a three-dimensional simulation image, the template feature map comprising the target structure; compare the template feature map to the three-dimensional feature map data; and indicate a probability of a three-dimensional point in the template feature map matching a location of a three-dimensional point in the three-dimensional feature map data.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
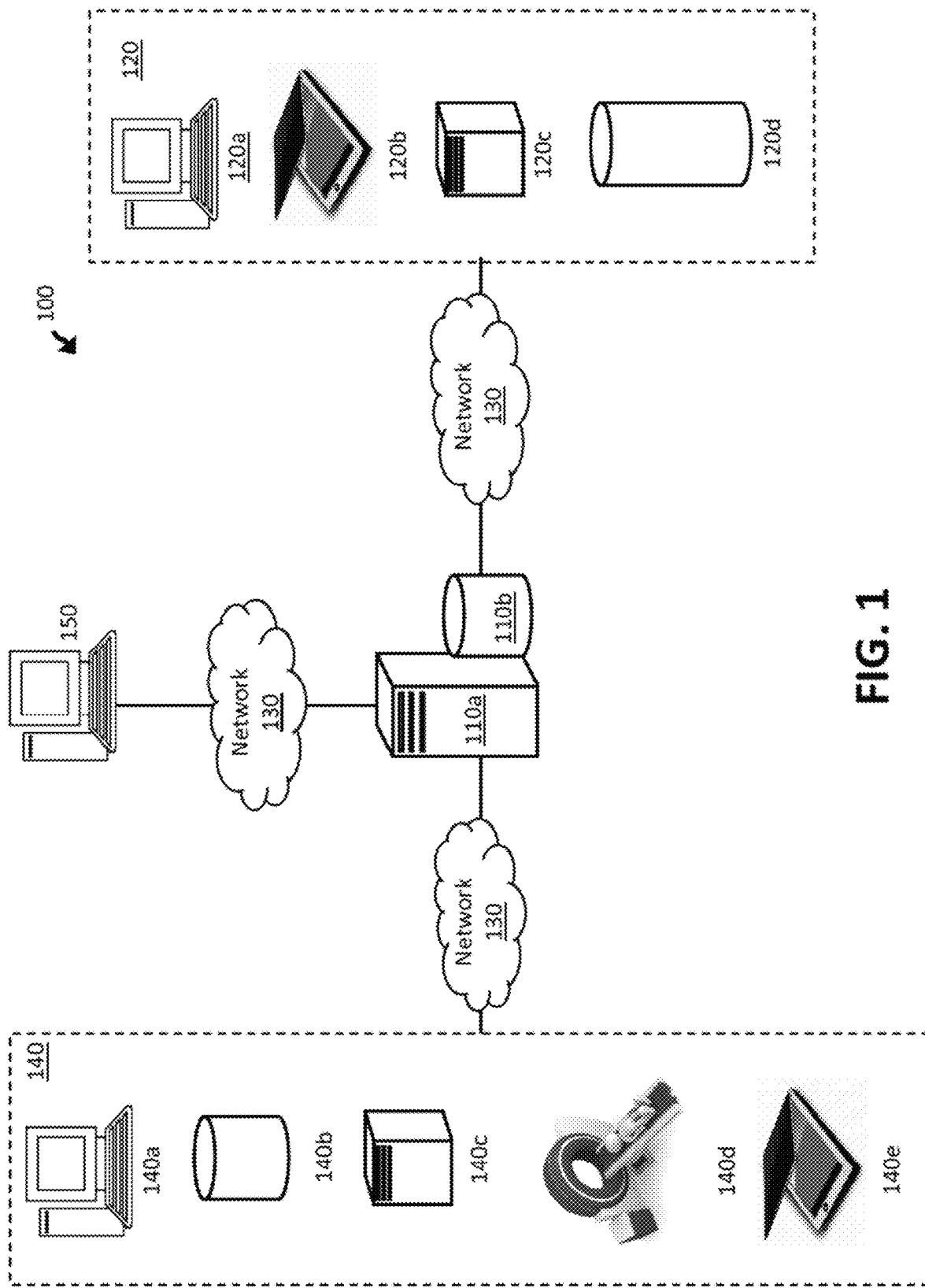
FIG. 1 illustrates components of a target structure tracking system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Radiotherapy clinics may utilize software solutions for executing radiation therapy. The software solutions may analyze current imaging information (e.g., real-time projection data), leverage temporal information about patient motion, and analyze radiation therapy treatment planning data such as historic simulation (or planning) data, to predict a location of the PTV and/or OAR structures throughout the radiation therapy treatment planning process.

An intelligent end-to-end target structure tracking system may employ machine learning models (such as neural networks), filters, algorithms, and various combinations of input modalities (e.g., forward projection models and back-projection models) to determine the location of PTVs and/or OARs using projection data. The end-to-end target structure tracking system may deliver results in the form of a probability distribution. The probability distribution may indicate the probability of a center of mass of a specific segment (e.g., organ, tumor, or other kind of anatomical landmark point) being at particular positions in a 3D space.

The target structure tracking system may operate in dual domains, converting two-dimensional (2D) projection data over time (indicated by 2D pixels associated with location (x, y) in a projection domain) into 3D space data (indicated by 3D voxels associated with location (x, y, z) in a volume domain). For example, upon receipt of a kV image, the target structure tracking system may use reconstruction algorithms (such as back projection with optional filtration) to convert 2D projection data into 3D space data. Similarly, for instance upon receipt of an MRI image, the target structure tracking system may convert projection data in k-space (in the frequency domain) into 3D space (volume domain). The sequential 2D projection data and 3D space data are two representations of the same object/structure. Unlike conventional approaches, the target structure tracking system takes advantage of both 3D space data and sequential 2D projection data by extracting relevant features in both domains. The 3D space data is used in determining a probability distribution of the current location of various PTVs and/or OARs in 3D space given historic projection data.

FIG. 1 illustrates components of a target structure tracking system 100, according to an embodiment. The target structure tracking system 100 may include an analytics server 110a, system database 110b, electronic data sources 120a-d (collectively electronic data sources 120), end-user devices 140a-e (collectively end-user devices 140), and an administrator computing device 150. Various components depicted in FIG. 1 may belong to a radiotherapy clinic at which patients may receive radiotherapy treatment, in some cases via one or more radiotherapy machines located within the clinic (e.g., medical device 140d). The above-mentioned components may be connected to each other through a network 130. Examples of the network 130 may include, but are not limited to, private or public LAN, WLAN, MAN, WAN, and the Internet. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The target structure tracking system 100 is not confined to the components described herein and may include additional or other components, not shown for brevity, which are to be considered within the scope of the embodiments described herein.

The analytics server 110a may generate and display an electronic platform configured to use various computer models (including artificial intelligence and/or machine learning models) to identify a probabilistic location of a structure, such as a PTV and/or OAR, in 3D space. More specifically, the platform may display data trajectory and/or motion patterns of one or more PTVs and/or OARs. The electronic platform may include graphical user interfaces (GUI) displayed on each electronic data source 120, the end-user devices 140, and/or the administrator computing device 150. An example of the electronic platform generated and hosted by the analytics server 110a may be a web-based application or a website configured to be displayed on different electronic devices, such as mobile devices, tablets, personal computer, and the like.

In a non-limiting example, a physician operating the physician device 120b may access the platform, input patient attributes or characteristics and other data, and further instruct the analytics server 110a to optimize the patient's treatment plan (e.g., segment a simulation image or perform other pre-processing steps on the simulation (or planning) image and/or projection data captured from the medical device 140(1). The analytics server 110a may utilize the methods and systems described herein to automatically learn relevant features of the simulation or planning images and/or projection data, and optimize the prediction of a center of mass (or any other portion) of a specific segment (or organ, tumor, or other anatomical landmark) such as the PTV and/or OAR being at a particular 3D location. The analytics server 110a may use the probability of the instantaneous 3D location of one or more target structures to calculate the structure's trajectory, motion, and/or deformations via one or more downstream applications. The analytics server 110a may display the results on the end user devices or adjust the configuration of one of end-user devices 140 (e.g., the medical device 140(1).

The analytics server 110a may host a website accessible to users operating any of the electronic devices described herein (e.g., end users), where the content presented via the various webpages may be controlled based upon each particular user's role or viewing permissions. The analytics server 110a may be any computing device comprising a processor and non-transitory machine-readable storage capable of executing the various tasks and processes described herein. Non-limiting examples of such computing devices may include workstation computers, laptop computers, server computers, and the like. While the target structure tracking system 100 includes a single analytics server 110a, the analytics server 110a may include any number of computing devices operating in a distributed computing environment, such as a cloud environment.

The analytics server 110a may execute software applications configured to display the electronic platform (e.g., host a website), which may generate and serve various webpages to each electronic data source 120 and/or end-user devices 140. Different users may use the website to view and/or interact with the predicted results. Different servers, such as server 120c and clinic server 140c may also use the predicted results in downstream processing. For example, the analytics server 110 may use the probability of the instantaneous 3D location of one or more target structures to track the movement of the one or more structures over time. The probability distribution received by the analytics server 110a (or server 120c and/or clinic server 140c) from the target structure tracking system may be applied, for example, to cardiac radioablation, such that a pattern of a beating heart can be identified, minimizing damage to healthy tissue. Additionally, or alternatively, the target structure tracking system 100 may track a soft tissue structure (e.g., a tumor or OARs) based on kV projection data.

The analytics server 110a may be configured to require user authentication based upon a set of user authorization credentials (e.g., username, password, biometrics, cryptographic certificate, and the like). The analytics server 110a may access the system database 110b configured to store user credentials, which the analytics server 110a may be configured to reference in order to determine whether a set of entered credentials (purportedly authenticating the user) match an appropriate set of credentials that identify and authenticate the user.

The analytics server 110a may also store data associated with each user operating one or more electronic data sources 120 and/or end-user devices 140. The analytics server 110a may use the data to weigh interactions while training various AI models accordingly. For instance, the analytics server 110a may indicate that a user is a medical professional whose inputs may be monitored and used to train the machine learning or other computer models described herein.

The analytics server 110a may generate and host webpages based upon a particular user's role within the system 100. In such implementations, the user's role may be defined by data fields and input fields in user records stored in the system database 110b. The analytics server 110a may authenticate the user and may identify the user's role by executing an access directory protocol (e.g. LDAP). The analytics server 110a may generate webpage content that is customized according to the user's role defined by the user record in the system database 110b.

The analytics server 110a may receive simulation (or patient setup, or planning) data (e.g., historic simulation images and pre-processed segments) from a user or retrieve such data from a data repository, analyze the data, and display the results on the electronic platform. For instance, in a non-limiting example, the analytics server 110a may query and retrieve simulation images from the database 120d and combine the simulation images with segment data received from a physician operating the physician device 120b. The analytics server 110a may then use various models (stored within the system database 110b) to analyze the retrieved data. The analytics server 110a may then display the results via the electronic platform on the administrator computing device 150, the electronic physician device 120b, and/or the end-user devices 140.

The electronic data sources 120 may represent various electronic data sources that contain, retrieve, and/or input data associated with a patient's treatment plan including patient data and treatment data. For instance, the analytics server 110a may use the clinic computer 120a, physician device 120b, server 120c (associated with a physician and/or clinic), and database 120d (associated with the physician and/or the clinic) to retrieve/receive data associated with the patient's treatment plan.

End-user devices 140 may be any computing device comprising a processor and a non-transitory machine-readable storage medium capable of performing the various tasks and processes described herein. Non-limiting examples of an end-user device 140 may be a workstation computer, laptop computer, tablet computer, and server computer. In operation, various users may use end-user devices 140 to access the GUI operationally managed by the analytics server 110a. Specifically, the end-user devices 140 may include clinic computer 140a, clinic database 140b, clinic server 140c, a medical device, such as a CT scan machine, radiotherapy machine (e.g., a linear accelerator, particle accelerator (including circular accelerators), or a cobalt machine), and the like (140d), and a clinic device 140e.

The administrator computing device 150 may represent a computing device operated by a system administrator. The administrator computing device 150 may be configured to display data treatment attributes generated by the analytics server 110a (e.g., various analytic metrics determined during training of one or more machine learning models and/or systems); monitor various models utilized by the analytics server 110a, electronic data sources 120, and/or end-user devices 140; review feedback; and/or facilitate training or retraining of the neural networks that are maintained by the analytics server 110a.

The medical device 140d may be a radiotherapy machine configured to implement a patient's radiotherapy treatment. The medical device 140d may also include an imaging device capable of emitting x-rays such that the medical device 140d may perform imaging various methods to accurately image the internal structure of a patient. For instance, the medical device 140d may include a rotating imaging system (e.g., a static or rotating multi-view imaging system). Non-limiting example of a multi-view system may include a stereo system (e.g., two imaging systems may be arranged orthogonally).

The image of the patient's anatomy allows for the identification and tracking of PTVs and/or OARs. Imaging the patient's anatomy may include using the medical device 140d to scan the patient using CT images, CBCT images, ultrasound images, MM images, PET images, images obtained via some other imaging modality, or a combination thereof. Although digital tomosynthesis (DTS) is not a direct tomography model, the analytics server 110a may image the patient's anatomy using DTS imaging and track PTVs and/or OARs using the imaging data because DTS uses the relative geometry between the projections to calculate a relative 3D reconstruction with limited (e.g., dependent on the scan arc angle) resolution in imaging.

Scanning (or imaging) the patient's anatomy using the medical device 140d results in projection data. The projection data may be 1D (e.g., a line detector in the medical device 140d rotating around the patient) or 2D (e.g., a panel detector in the medical device 140d rotating around the patient). Further, the medical device 140d may be capable of emitting and/or generating various strengths of signals for imaging the patient's anatomy. For example, projection data may be based on kV projections, MV projections, stereo kV/kV projection pairs (or projection sets), MV/kV projection pairs (or projection sets), dual energy projections, and the like. In some configurations (e.g., to support stereo kV/kV projections and MV/kV projections), the analytics server 110a may add additional input layers to the target structure tracking system. If the projection is a dual energy projection, the analytics server 110a may optimize parameters in the target structure tracking system to de-noise the dual energy image and enhance target visibility.

In operation, the analytics server 110a may receive projection data (either 1D or 2D) from the medical device 140d. The analytics server may use machine learning models in the target structure tracking system 100 to extract feature maps from the projection data. The analytics server 110a may convert the feature map into a different dimension using, for example, a differentiable back projection layer, or any other appropriate method of converting 2D data into 3D data (e.g., 3D tomographic reconstruction, iterative reconstruction algorithms, manifold learning, etc.).

The analytics server 110a may also receive a 3D simulation (or planning) image and, in some configurations, segment information. The segment information may be the delineation of a structure (e.g., PTVs and/or OARs) in the simulation image. The analytics server 110a may use machine learning models in the target structure tracking system 100 to generate a 3D template image from the simulation image and segment information. In some configurations, the template image may be a human readable image. In some configurations, the feature map may be represented by a human readable image. In some configurations, the template image may represent the relevant features used to match and/or track the PTV and/or OAR. For instance, the template image may be a feature map. The analytics server 110a may use various methods to generate a template image, such as the methods and systems described in U.S. Patent Publication No. 2020/0285915, which is incorporated by reference herein in its entirety. The analytics server 110a may compare the template image (or feature maps) to generate a probability distribution of where the structures, such as the PTV and/or OAR (indicated by the template image) are located in 3D space.

The analytics server 110a may be in communication (real-time or near real-time) with the medical device 140d, such that a server/computer hosting the medical device 140d can adjust the medical device 140d based on the treatment attributes generated by the analytics server 110a. For instance, the radiotherapy machine may adjust the gantry, beam blocking device (e.g. multi leaf collimator MLC), and couch based on a trajectory of the PTV and/or OAR structure using the probabilistic location of the PTV and/or OAR structure determined by the analytics server 110a. The analytics server 110a may transmit instructions to the radiotherapy machines indicating any number or type of treatment attributes (e.g., field geometry settings) to facilitate such adjustments.

The analytics server 110a may store machine learning models (e.g., neural networks, random forest, support vector machines, or other deep learning models), that are trained to predict the probability of a center of mass (or other portion) of a specific segment (or organ, tumor, or other anatomical landmark) being at a location in 3D space. The analytics server 110a may also store target structure tracking systems (e.g., a chain of machine learning models and other algorithms, filters, and the like) that are trained to predict the probability of a center of mass of a structure being at a location in 3D space. The trained and stored target structure tracking systems may include systems with multi-channel inputs and multi-channel outputs. Depending on the inputs received (e.g., dual energy inputs vs. single energy inputs), the analytics server 110a may apply a system configured to receive a multi-channel input or a system configured to receive a single channel input.

The machine learning models stored in the system database 110b may correspond to individual radiotherapy clinics or otherwise different sets of radiotherapy machines (e.g., radiotherapy machines that are located at individual radiotherapy clinics, are located in different geographical regions, treat specific types of diseases (e.g., different type of cancers), treat specific genders, etc.). For example, both the machine learning models, and the end-to-end target structure tracking system may be associated with an identifier indicating the radiotherapy clinic, set of radiotherapy machines, or a specific disease for which it is configured to predict the probability of a reference point of a template image being at a location in 3D space.

An operator at a radiotherapy clinic may access an end-user device 140 located at the clinic or access an account associated with the clinic. The operator may provide an input at a user interface that causes the end user device 140 to transmit a request to access a machine learning model (or an end-to-end target structure tracking system) that is associated with the clinic and/or the radiotherapy machines located within the clinic. The request may include an identifier associated with the machine learning model, the clinic, and/or the set of radiotherapy machines that the analytics server 110a may use as a key in a look-up table to identify the machine learning model (or end-to-end system). The analytics server 110a may receive the request and, in some cases, after authenticating the user, identify the machine learning model via the identifier. The analytics server 110a may transmit the identified machine learning model to the end-user device 140 or send an alert indicating the end-user device is authorized to access the model(s). Upon receipt or access to the machine learning model and/or end-to-end system, the end user device 140 may perform the systems and methods described herein to train or retrain the machine learning model to predict the probability of a reference point of a template image being at a location in 3D space.

Figure 2:
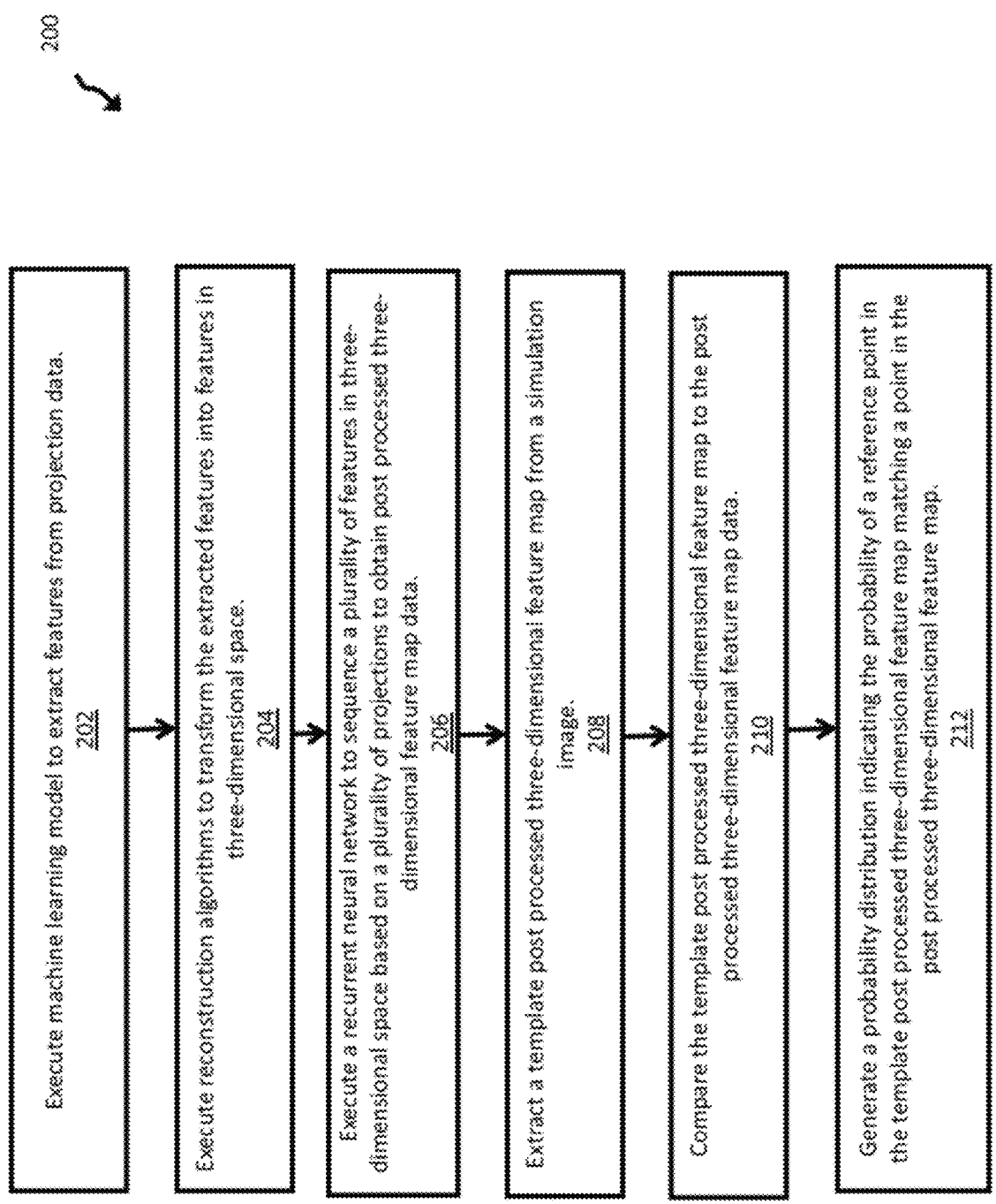
FIG. 2 shows execution steps of a method for determining a probability of a structure location in a 3D space, according to an embodiment.

FIG. 2 shows execution steps of a method 200 for determining a probability of a structure location in a 3D space, according to an embodiment. The method 200 may include steps 202-212. However, other embodiments may include additional or alternative steps, or may omit one or more steps altogether. The method 200 is described as being executed by a server, such as the analytics server described in FIG. 1. However, one or more steps of method 200 may be executed by any number of computing devices operating in the distributed computing system described in FIG. 1. For instance, one or more computing devices may locally perform part or all of the steps described in FIG. 2.

In step 202, the analytics server may execute a machine learning model to extract features from projection data (e.g., data associated with a projection). In some configurations, the projection data may include time series information. The analytics server may receive the projection data from an imaging system such as a system capable of emitting the appropriate radiation for CT images, CBCT images, MRI images, PET images, ultrasound images, and the like. Scanning (or imaging) the patient's anatomy using the imaging system results in the projection data (e.g., imaging projection data).

The projection data may provide the analytics server (or user, downstream application, or other servers) image information regarding the internal structure of the patient's anatomy. Specifically, imaging the patient's anatomy (and generating projection data associated with the internal structure of the patient) is performed around one or more target structures (such as PTVs and/or OARs) such that the analytics server (or user, downstream application, or other servers) may evaluate the one or more target structures (including the size, position, trajectory, motion pattern, and the like).

The analytics server may use a machine learning model to extract features from the projection data to generate a feature map. The projection data may be 1D or 2D based on whether the detector used to detect the radiation is a line detector or a panel detector. The projection data may include kV projections, MV projections, stereo kV/kV projections, MV/kV projections, dual energy projections, and the like.

In some configurations, the analytics server may perform pre-processing on the projection data before extracting features of the projection data. Example pre-processing algorithms may include defect pixel correction, dark field correction, conversion from transmission integrals into attenuation integrals (e.g., log normalization with air norm), scatter correction, beam hardening correction, decimation, and the like. In some configurations, the analytics server may extract features from raw projection data. In some configurations, the analytics server may receive pre-processed projection data.

In step 204, the analytics server may execute reconstruction algorithms to transform the extracted features into features in 3D space. As discussed herein, the projection data may be 1D or 2D. The analytics server may use any suitable method of 3D reconstruction such as the Feldkamp-Davis-Kress (FDK) algorithm to transform the 1D or 2D projection data into 3D space data.

In step 206, the analytics server may execute a machine learning model with memory (or internal states) such as a recurrent neural network to sequence a plurality of features in 3D space based on a plurality of projections to obtain post processed 3D feature map data. In some configurations, the analytics server may execute a recurrent neural network to sequence a plurality of features in 3D space based on a plurality of projections to obtain 3D image data. The analytics server may convert the 1D or 2D projection data into 3D space and subsequently sequence the projection data to create a 3D image of the patient's anatomy. In some configurations, the 3D image may be a human readable image.

However, the 3D image is not limited to human readable images. For instance, in some configurations, the 3D image may represent the relevant features used to match and/or track the PTV and/or OAR. That is, the 3D image may be a feature map. The 3D image (and/or feature map) of the patient's anatomy is a simulation of the patient's anatomy/organs including the target structure in 3D space.

In step 208, the analytics server may extract a template post processed 3D feature map from a diagnostic image, treatment simulation image, treatment planning image, or patient setup image. In some configurations, the analytics server may extract a template image from a diagnostic image, treatment simulation image, treatment planning image, or patient setup image. The simulation (or patient setup) image is an image associated with the patient's treatment. For example, the image used to diagnose the patient with a particular cancer may be called the diagnostic image. In another example, a simulation image may be a CT image, a 4D-CT image, a CBCT image, an MRI image, a 4D MM image, a PET image, or other image, simulated of the patient's anatomy. In some configurations, a patient setup image may be a CT image, a 4D-CT image, a CBCT image, an MRI image, a 4D Mill image, a PET image, or other image, taken of the patient's anatomy during patient setup. Therefore, extracting is not limited to diagnostic images.

The diagnostic image, treatment simulation image, treatment planning image, or patient setup image, while indicating a particular tumor or other affliction, may also indicate the area around the tumor and other structures around the tumor. The analytics server may extract a template image (or feature map) from the simulation image (or diagnostic image, or patient setup image) to generate a new image (the template image or feature map) of the target tumor without the less relevant structures. The template image may be a delineated (segmented or contoured) portion of the simulation image. That is, the simulation image may become a planning image (or template image/feature map) when a contour is drawn on the image (manually or automatically).

The analytics server may receive a segmented template image such that the analytics server does not need to extract a template image or feature map from a simulation image (or patient setup image). In some configurations, the analytics server may receive a simulation image (or patient setup image) and segmentation information. The analytics server may use the segmentation information to extract a template image (or feature map) from the simulation image (or patient setup image).

In step 210, the analytics server may compare the template post processed 3D feature map to the post processed 3D feature map. In some configurations, the analytics server may compare a template image to the 3D image data (e.g., the 3D image data determined in step 206). In some configurations, the analytics server uses any suitable means for template matching. The analytics server may apply a correlation filter to determine the correlation between the template image and the 3D image data. The analytics server may perform feature-based comparisons of the template image and the 3D image (e.g., using neural networks). The analytics server may convolve the template image and the 3D image data to evaluate the similarities between the template image and the image. In operation, the analytics server may compare one or more points in the template image to one or more points in the 3D image to determine whether points in the 3D image match reference points in the template image. The analytics server may determine whether (and where) the template image is represented in the 3D image or the probability of the template image (or features) located in the 3D image.

In step 212, the analytics server may generate a probability distribution indicating the probability of a reference point in the template post processed 3D feature map matching a point in the post processed 3D feature map. In some configurations, the analytics server may compare a center of mass (or a portion) of a structure in the post processed 3D feature map (or template image) matching a point in the post processed 3D feature map (or 3D image). Based on the comparison in step 210, the probability map may be transmitted, by the analytics server, to a downstream application (e.g., subsequent algorithms) performing analysis indicating the peak (e.g., peak of the sidelobe) where the target structure matches. The analytics server may also transmit, to a downstream application, the distinctiveness or confidence of such a match.

Figure 3:
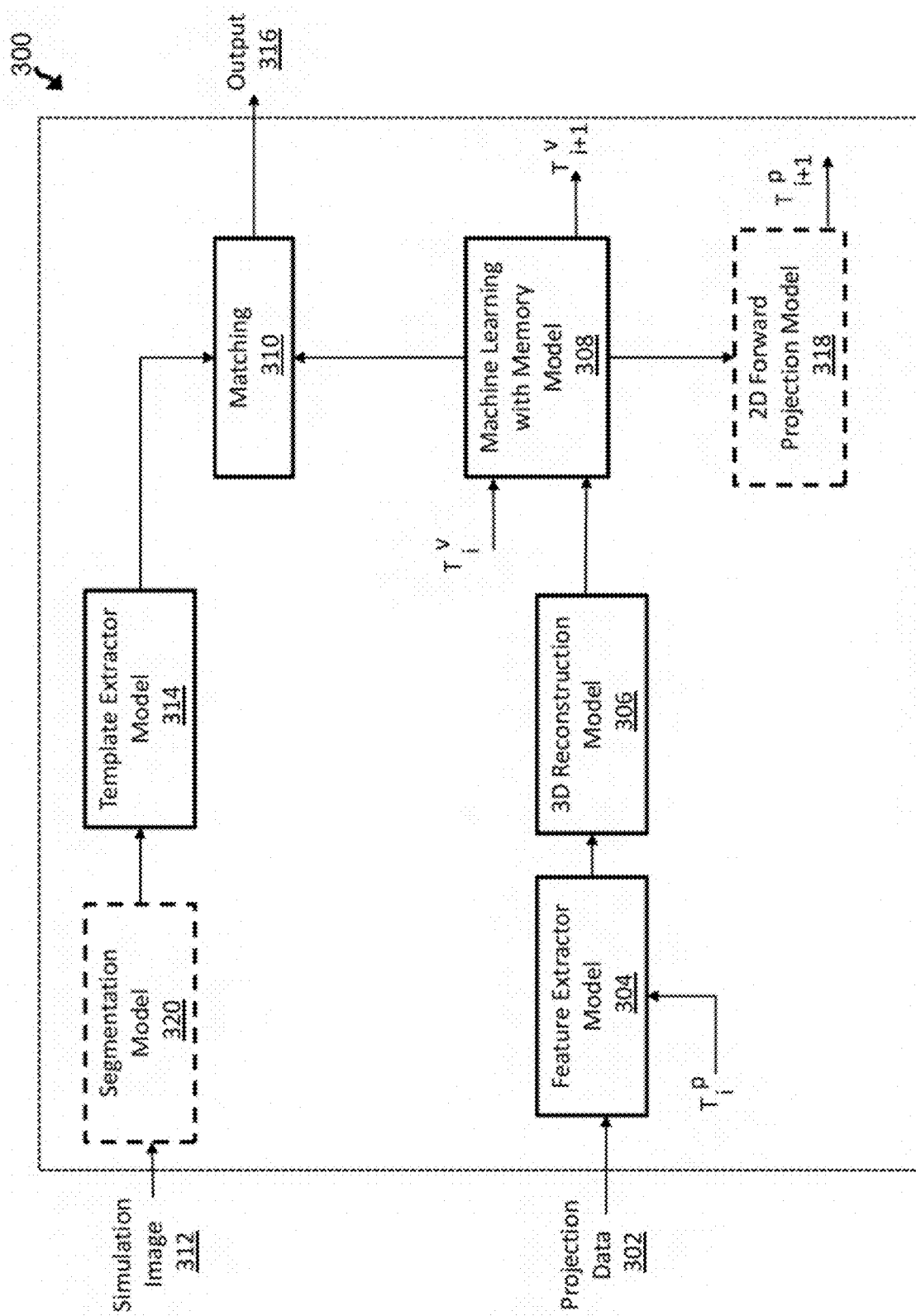
FIG. 3 illustrates a target structure tracking system used to determine a probability distribution of a structure location in a 3D space, according to an embodiment.

FIG. 3 illustrates a target structure tracking system 300 used to determine the probability of the instantaneous 3D location of one or more target structures in a 3D space, according to an embodiment. The target structure tracking system 300 includes a feature extractor model 304, a 3D reconstruction model 306, a machine learning with memory model 308, a template extractor model 314, and matching 310. Matching 310 may be a matching protocol, a matching operation, a comparator performing matching, or a matching method and system described in U.S. Pat. No. 8,396,248, which is incorporated by reference herein in its entirety. The target structure tracking system 300 may optionally include a 2D forward projection model 318 and a segmentation model 320. The inputs into the target structure tracking system 300 include a simulation image 312 (or patient setup image) and projection data 302. Output 316 (a probability distribution) is the output of the target structure tracking system 300.

The analytics server may receive 1D or 2D projection data 302 from an imaging device (e.g., medical device 140d in FIG. 1). For example, a medical device (e.g., an imaging device, a radiotherapy machine) may rotate around the patient, projecting radiation and detecting the projected radiation to capture the projection data. The projection data 302 may include kV projections, MV projections, stereo kV/kV projections, MV/kV projections, dual energy projections, or other projection pairs (or sets) and the like. In some configurations, the target structure tracking system 300 is capable of, and is trained to, receive a multi-channel input. For example, the projection data 302 may be projections of the same energy from various angles. For instance, the medical device may rotate around the patient, imaging the patient and capturing projection data 302 from various angles. Additionally, or alternatively, the projection data 302 may be projections from a single angle at various energies. For instance, the medical device may not rotate, statically imaging the patient.

The analytics server may employ machine learning model(s) such as neural networks, random forests, support vector machines, and the like, as feature extractor model 304 to extract a feature map from the projection data 302. In some configurations, the output of the feature extractor model 304 may be multiple feature maps that jointly encode relevant feature information. Feature information may include radiation intensity data, attenuation data, removed data, and the like.

The analytics server may process the projection data 302 based on the projection characteristics (e.g., strength of projection, angle of projection, number of projections). For example, the analytics server may use the feature extractor model 304 to extract a feature map, and subsequently reconstruct the projection space into volumetric space using the 3D reconstruction model 306 based on projection data 302 characteristics. Additionally, or alternatively, the analytics server may reconstruct the projection space into volumetric space using the 3D reconstruction model 306 and subsequently extract features of the volumetric space using the feature extractor model 304 based on projection data 302 characteristics. The analytics server may also apply filters to reduce noise and/or process the projection space and/or 3D space to improve the quality of the projection and/or 3D space.

Extracting the feature map using feature extractor model 304 as part the target structure tracking system 300 has the advantage, at least, of optimizing the feature extractor model 304 with respect to the goal of tracking a structure based on the projection data 302. For example, features may be extracted by optimizing weights for the weighted log-subtraction of dual energy projections based on generating image features that are well suited for template image tracking. That is, the feature extractor model 304 will learn how to select the relevant features for tracking the target structure (e.g., PTV and/or OARs).

The feature extractor model 304 may be a convolutional neural network extracting 2D feature data and generating a 2D feature map from 2D projection data 302. The analytics server may generate the feature map by applying a kernel to the projection data 302. For example, the kernel may slide over the inputs of the projection data 302 and an element by element dot product of the kernel and the array may generate a feature map. The dimensions of the kernel and feature map are based on the dimensions of the projection data 302. The kernel is designed to detect the presence of certain features, the detected features arranged in the feature map.

The analytics server may convert the feature maps generated from the feature extractor model 304 from a 2D feature map, for instance, to a 3D feature map in the 3D reconstruction model 306. In an example, the analytics server may employ a differentiable back projection model. The differentiable back projection model is an improvement over a filtered single projection using a reconstruction algorithm such as the FDK algorithm. That is, the analytics server may perform the back projection, FDK algorithm, or the like in terms of a neural network, iteratively executing the reconstruction algorithm and learning the parameters associated with reconstructing the volume domain (e.g., the 3D domain) from the projection domain (e.g., the 2D domain) using a loss function considering. The loss function may consider the peak-to-sidelobe ratio of an output probability distribution. The differentiable back projection model allows the analytics server to jointly optimize the corrections in both the volume domain and the projection domain, instead of using the reconstruction algorithms to iteratively compute a single solution in the volume domain. Accordingly, the differentiable back projection model applied in the 3D reconstruction model 306 has both forward paths (for the 3D projection) and backward paths (to enforce optimizing the reconstruction algorithm over time).

The analytics server may process the resulting 3D feature maps in a machine learning with memory model 308. Neural networks using memory may rely on hidden states to process the data sequentially. A neural network employing memory, such as a long short-term memory network (LSTM) or other recurrent network, may receive hidden states as inputs from databases and/or from memory. The analytics server may store hidden states in the recurrent network in the form of one or a sequence of 3D spaces. The recurrent network processes the projection data sequentially, using the current hidden state $(T_i^v)$ of the volume data in the LSTM to predict a future hidden state $(T_{i+1}^v)$ of the volume data. In some configurations, the hidden states may be initialized with the patient setup CBCT, a short kV projection sequence, or synthesized projection data coming from prior images (e.g. simulation CT or 4D CT images).

The analytics server may use the 3D feature maps to generate a 3D image used in performing template matching (e.g., matching 310). The analytics server may use the hidden states as an input to the LSTM such that the LSTM sequences the 3D feature maps and hidden states to generate the 3D image.

In some configurations, the analytics server may employ a 2D forward projection model 318. The 2D forward projection model 318 may be a forward projection layer (or module) that receives the 3D feature map data from the 3D reconstruction model 306 and generates 2D projection data $(T_{i+1}^P)$. The analytics server may perform forward projection modeling in terms of a neural network. The forward projection model 318 may be a differentiable forward projection layer such that the analytics server may, during training, optimize the corrections in both the volume domain and the projection domain. The analytics server may feed the projection data $(T_i^P)$ into the feature extractor model 304 to emphasize the relevant features of the projection. That is, the feature extractor model 304 profits from knowledge about the 3D image domain because of the relevant feature insight from the 2D projection data. The reliance on the hidden states and memory of the machine learning with memory model 308 is reduced because of the insight obtained using the 2D deconstruction model 318. The analytics server learns data in both 2D projection space and 3D space. Accordingly, the transformation between the 2D projection space and the 3D space is performed in a substantially lossless manner, reducing the likelihood of losing relevant features in the 2D projection space and 3D space.

The analytics server may extract template images (or feature maps) from the simulation image 312 (or patient setup image) using a template extractor model 314. The analytics server may extract a template image from the simulation image 312 based on segmented structures. In some configurations, the analytics server may receive the simulation image 312 with segmentation information. For example, the analytics server may receive the simulation image 312 with indicators delineating the template image on the simulation image 312. For example, the simulation image 312 may be of a ribcage, and a tumor on the ribcage may be identified during pre-processing steps. The analytics server may use the segmented simulation image (e.g., a planning image) to extract a template image (or feature map).

In some configurations, the analytics server may receive both a first input (a simulation image 312) and a second input (segmentation information). A user may derive the segmentation information from radiotherapy treatment planning information associated with the simulation image 312 (and ultimately associated with the patient to be treated). That is, instead of the simulation image 312 being segmented according to various pre-processing steps, the analytics server applies the segmentation information to the simulation image 312 to segment the simulation image.

In some configurations, the analytics server applies the segmentation model 320 to segment the simulation image 312. The analytics server segments the simulation image 312 based on the trained segmentation model 320, the trained segmentation model 320 generating contours on the simulation image 312. Instead of effectively cropping an image, the analytics server may learn to consider the surrounding information in the simulation image 312. For example, the analytics server may consider the context of the structure. If the simulation image 312 is a tumor in a ribcage, the analytics server may learn features of the ribcage and the tumor location with respect to the ribcage. The analytics server may use a reference point of segmentation (e.g., a point associated with the target structure) and learn the area around the reference point.

In some configurations, the analytics server may train the segmentation model 320 to perform multi-structure segmentation (e.g., segmenting multiple structures in the simulation image 312). The analytics server may segment a single energy image (such as a single energy CT) and/or a dual energy image (such as a dual-energy CT).

The analytics server may use the template extractor model 314 to extract a template image (or feature map) based on the segmentation information (determined automatically by the analytics server in the segmentation model 320, or received by the analytics server) and the simulation image 312. The template image may be a representation of the structure (e.g., the PTV and/or OAR) that the analytics server uses to match with transformed projection data 302. The template extractor model 314 may be a machine learning model (such as a neural network, deep neural network, a series of neural networks, and the like).

In some configurations, the template extractor model 314 may receive a CT/CBCT image with time series information. The template extractor model 314 may detect structure deformations such that the analytics server learns how to account for the deformation. In some configurations, the analytics server may employ deformation modeling to determine a deformation field associated with a target structure (or target structures). Accordingly, the analytics server may output 316 a probability distribution indicating the probability of points in the template image (or feature map) being at a particular location, given the deformations of the structure over time. For example, the analytics server may indicate the probability of a 3D point in the template feature map matching the location of a 3D point in the 3D feature map based on the deformation field.

The analytics server may apply the 3D localization of the template, generated by template extraction 314, to the output of the machine learning with memory model 308 using matching 310. The analytics server may use matching 310 to compare template images (or feature maps) to 3D images (or feature maps). In some configurations, the analytics server may compare multiple feature maps to 3D feature maps such that the output 316 is a multi-channel probability distribution. The analytics server may perform matching 310 using any suitable method of template matching. In some configurations, matching 310 may be a 3D correlation filter. The analytics server may apply the 3D correlation filter when the analytics server receives reduced dimensionality data (e.g., pre-processed segmentation information in the simulation image). The correlation filter may return a correlation response indicating whether the 3D image data (output from the machine learning with memory model 308) correlates with the template image (or feature map) from the template extractor model 314.

In some configurations, matching 310 may be a convolution operation (or a convolutional neural network) in the spatial domain. For instance, the convolution operation includes convolving each point of the template image (or feature map) with each point in the 3D image (or feature map). Additionally, or alternatively, the convolution operation may be performed using point-wise multiplication in the Fourier domain (e.g., using Fast Fourier Transforms (FFT) and inverse FFT (iFFT)). The analytics server may employ convolution when the analytics server receives and analyzes a complete volume simulation image 312. The output of the convolution operation may indicate the position where there is the best match between the template image from the template extractor model 314 and the 3D image data.

Output 316 may be the probability of an instantaneous 3D position of the template image in 3D space. The output 316 measures the probability that a reference point in the template image will be at a particular 3D location (e.g., a center of mass of a specific segment/organ/tumor, or any kind of anatomical landmark point) in the 3D space (e.g., in the 3D image data). The output 316 may be a probability distribution of where the template image is likely to be positioned in 3D space. An accurate estimation of the location of the template image in the patient's body improves the accuracy of other downstream algorithms and/or applications. The analytics server may deliver output 316 to downstream algorithms and/or application such that the analytics server (or other server) may determine the 3D trajectory of the structure.

The analytics server may also generate multiple probability distributions of the locations of multiple template images in 3D locations. That is, one target structure tracking system 300 may be used to track multiple template images (or feature maps). For example, the analytics server may generate a multi-channel probability distribution indicating both the probability of a 3D point in the template feature map matching the location of a 3D point in the 3D image (or other feature map data) and the probability of a 3D points in a second template feature map matching the location of a 3D point in the 3D image (or other feature map data). Additionally, or alternatively, the analytics server may generate a single probability distribution of the locations of multiple template images in 3D locations using a multi-channel output. Accordingly, the analytics server may simultaneously track multiple structures in 3D space using multiple channels of the target structure tracking system 300. For example, the analytics server may track both the OARs and the PTVs.

The analytics server may also learn the motion covariance between the various structures. For example, as discussed herein, the location of a ribcage, and the location of tumor on the ribcage may be determined. The analytics server may use the motion of the ribcage in determining the motion of the tumor because of the covariance between the tumor and the ribcage. In another example, the analytics server may learn the motion covariance between other structures of the body such as the duodenum and pancreas. Additionally, or alternatively, the analytics server may learn an offset between the various structures.

Additionally, or alternatively, the target structure tracking system 300 may output a confidence value associated with the probability distribution. For example, the analytics server may evaluate the peak-to-sidelobe ratio in determining a confidence in the probability distribution. For instance, the confidence value may be based on peaks and sidelobes associated with the probability distribution. Additionally, or alternatively, the confidence associated with the probability distribution may be based on structure location prediction accuracy during training.

Additionally, or alternatively, the target structure tracking system 300 may output one or more classifications. For example, the analytics server may classify whether a point in space is likely occupied by a target structure (e.g., the PTV and/or OAR) based on evaluating the probability of the template image (or feature map) matching a particular location in 3D space. The analytics server may compare the probability at the particular location to a threshold. If the probability at the particular location satisfies the threshold, the analytics server may classify that location as a location in the 3D space that occupies the target structure.

Additionally, or alternatively, the target structure tracking system 300 may output a 3D coordinate prediction of the structure location. Additionally, or alternatively, the target structure tracking system 300 may output a deformation field. That is, the target structure tracking system 300 may predict the deformation of the template image (or features). Additionally, or alternatively, the target structure tracking system 300 may output a probability distribution of a location of a reference point of a template image given deformations of the structure.

The analytics server may use deformation information (field) in the target structure tracking system 300 to improve the accuracy of predicting the location of the PTV and/or OAR. For example, the analytics server may use one or more vector fields to represent deformations in 3D space. Additionally, or alternatively, the analytics server may use a parametric model and/or a combination of affine deformations to represent deformations in 3D space. The analytics server may use the hidden states in the machine learning with memory model 308 to capture deformation information (e.g., anatomical changes in the structure).

Figure 6:
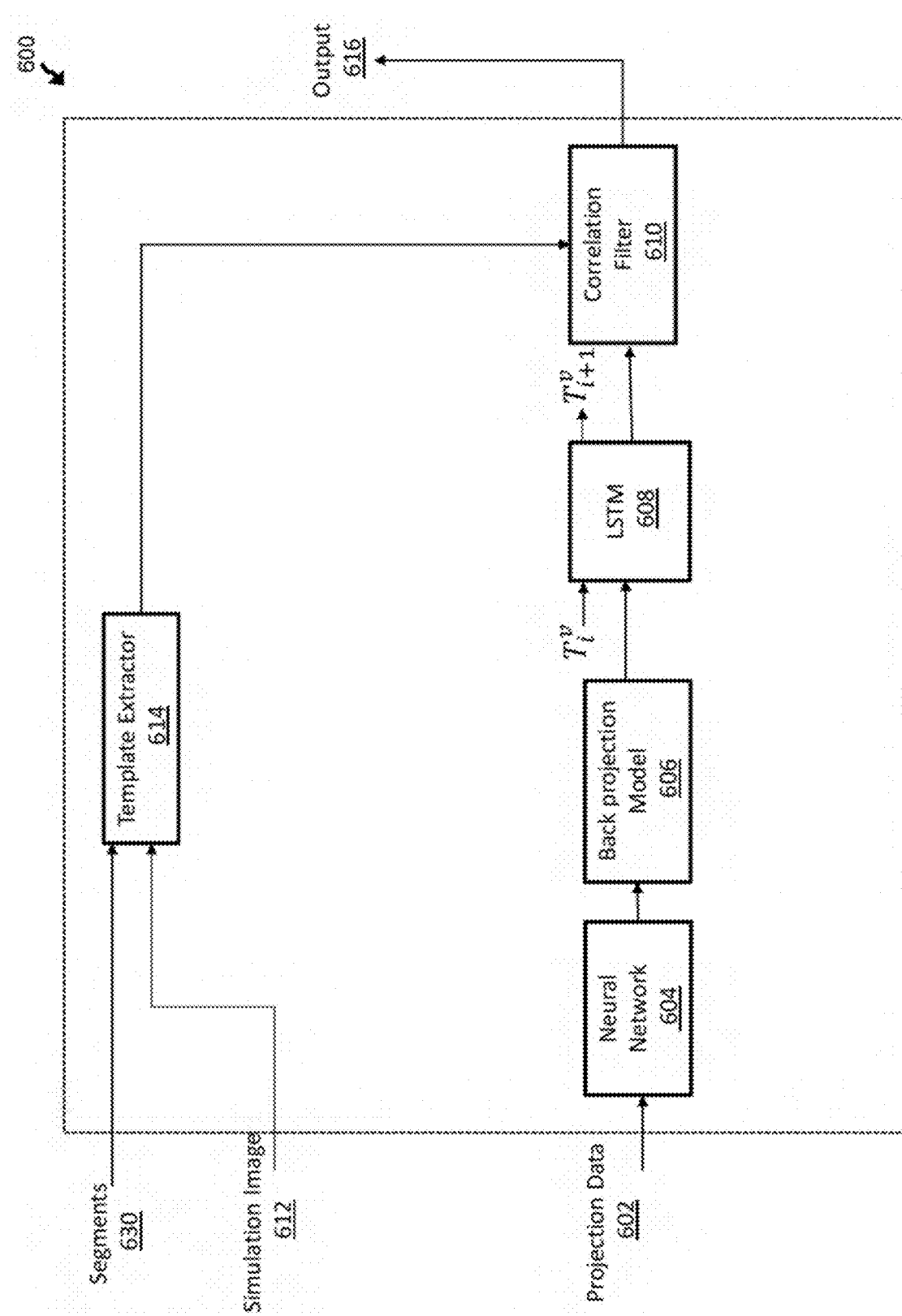
FIG. 6 illustrates a target structure tracking system used to determine a probability distribution of a structure location in a 3D space, according to an embodiment.

Referring to FIG. 6, the analytics server may configure the target structure tracking system 600 such that the feature extractor model (e.g., 304 in FIG. 3) is a neural network 604 (such as a convolutional neural network). The analytics server may configure the target structure tracking system 600 such that the 3D reconstruction model (e.g., 306 in FIG. 3) is a differentiable back projection model 606. The analytics server may configure the target structure tracking system 600 such that the machine learning with memory model (e.g., 308 in FIG. 3) is an LSTM network 608. The analytics server may also receive segments 630 (e.g., segmentation information from radiotherapy treatment planning information associated with simulation image 612) and simulation image 612. In some configurations, the simulation image 612 may be a patient setup image, or a diagnostic image. The analytics server may configure the target structure tracking system 600 such that the template extractor model (e.g., 314 in FIG. 3) is a template extractor 614. The analytics server may use the template extractor 614 to crop the simulation image 612 according to the segments 630. The analytics server may configure the target structure tracking system 600 such that the matching (e.g., 310 in FIG. 3) is a correlation filter 610.

Figure 7:
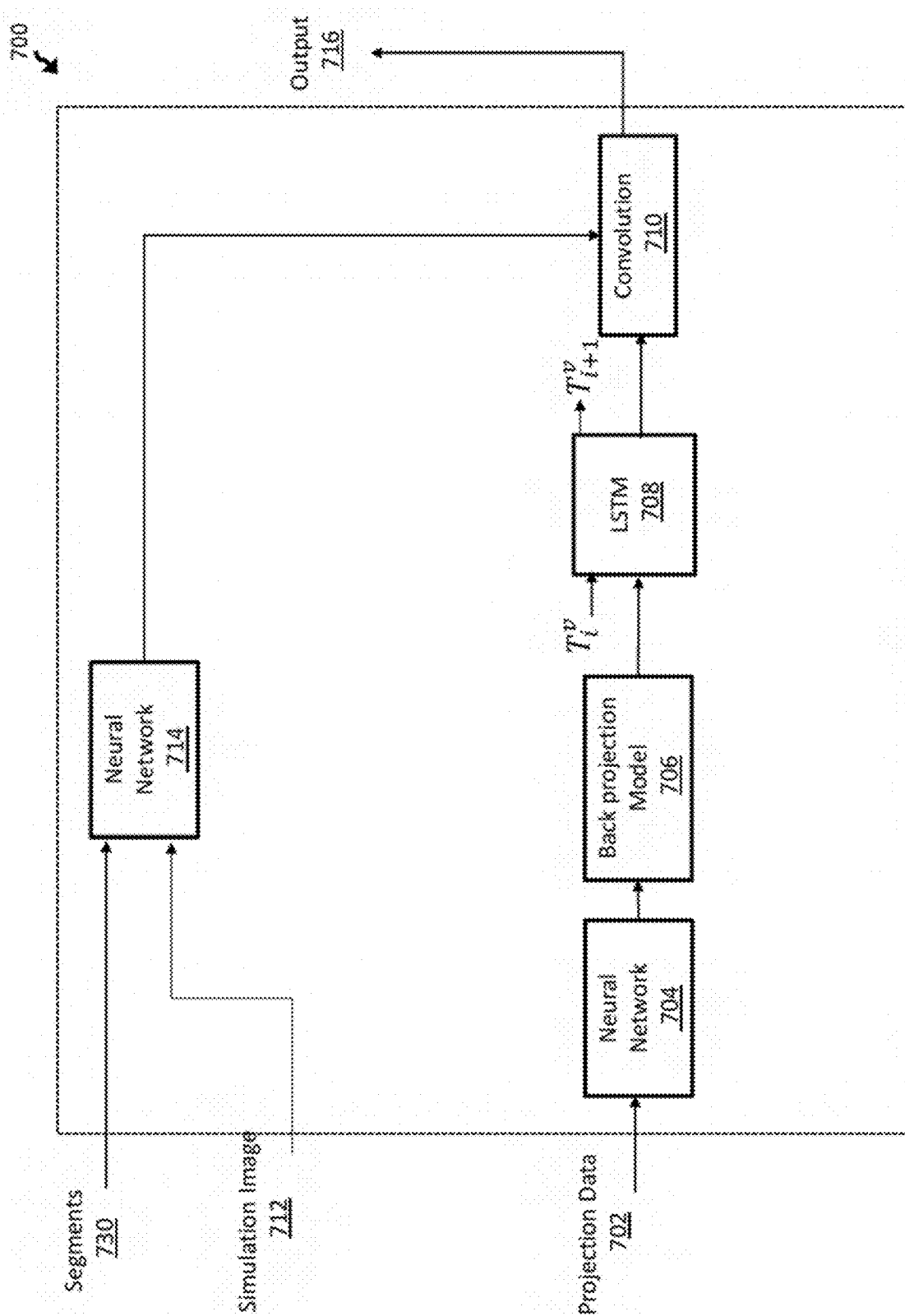
FIG. 7 illustrates a target structure tracking system used to determine a probability distribution of a structure location in a 3D space, according to an embodiment.

Referring to FIG. 7, the analytics server may configure the target structure tracking system 700 such that the feature extractor model (e.g., 304 in FIG. 3) is a neural network 704 (such as a convolutional neural network). The analytics server may configure the target structure tracking system 700 such that the 3D reconstruction model (e.g., 306 in FIG. 3) is a differentiable back projection model 706. The analytics server may configure the target structure tracking system 700 such that the machine learning with memory model (e.g., 308 in FIG. 3) is an LSTM network 708. The analytics server may also receive segments 730 (e.g., segmentation information from radiotherapy treatment planning information associated with simulation image 712) and simulation image 712. In some configurations, the simulation image 712 may be a patient setup image, or a diagnostic image. The analytics server may configure the target structure tracking system 700 such that the template extractor model (e.g., 314 in FIG. 3) is a neural network 714. The analytics server may use the neural network 714 to extract the relevant features for tracking the PTV and/or OAR from the simulation (or planning) image 712 and segments 730. The analytics server may configure the target structure tracking system 700 such that the matching (e.g., 310 in FIG. 3) is a convolution operation 710 (or a convolutional neural network).

Figure 8:
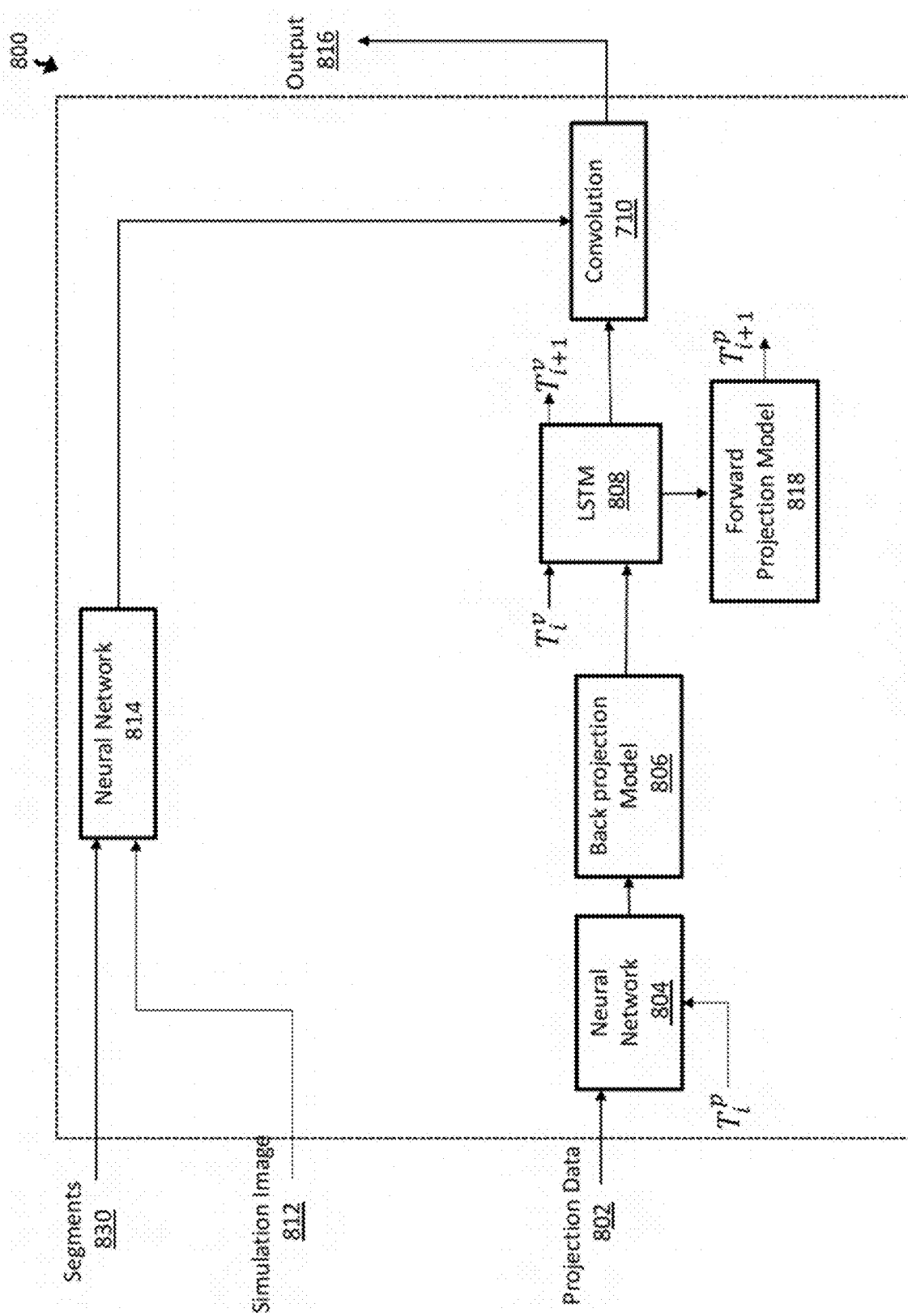
FIG. 8 illustrates a target structure tracking system used to determine a probability distribution of a structure location in a 3D space, according to an embodiment.

Referring to FIG. 8, the analytics server may configure the target structure tracking system 800 such that the feature extractor model (e.g., 304 in FIG. 3) is a neural network 804 (such as a convolutional neural network). The analytics server may configure the target structure tracking system 800 with a 2D forward projection model (e.g., 318 in FIG. 3). The 2D forward projection model may be a forward projection model 818, converting the 3D feature information from the differentiable back projection model 806 into 2D projection data. The neural network 804 may receive historic 2D projection data from the forward projection model 818 to facilitate in extracting relevant features. The analytics server may configure target structure tracking system 800 such that the 3D reconstruction model (e.g., 306 in FIG. 3) is a differentiable back projection model 806. The analytics server may configure the target structure tracking system 800 such that the machine learning with memory model (e.g., 308 in FIG. 3) is an LSTM network 808. The analytics server may also receive segments 830 (e.g., segmentation information from radiotherapy treatment planning information associated with simulation image 812) and simulation image 812. In some configurations, the simulation image 812 may be a patient setup image, or a diagnostic image. The analytics server may configure the target structure tracking system 800 such that the template extractor model (e.g., 314 in FIG. 3) is a neural network 814. The analytics server may use the neural network 814 to extract the relevant features for tracking the PTV and/or OAR. The analytics server may configure the target structure tracking system 800 such that the matching (e.g., 310 in FIG. 3) is a convolution operation 810 (or a convolutional neural network).

Figure 9:
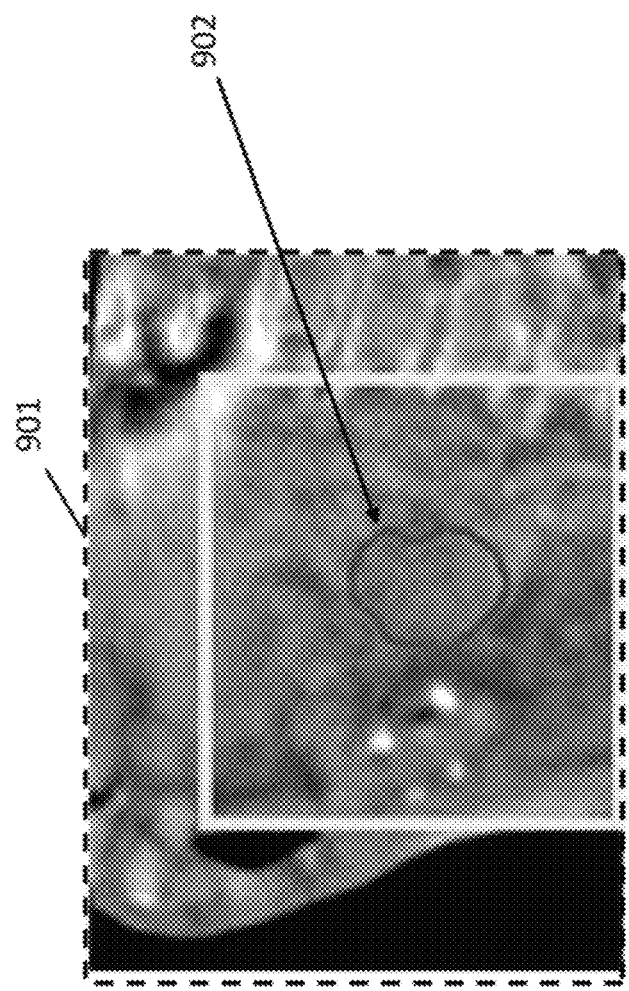
FIG. 9 illustrates a planning image received by the target structure tracking system, according to an embodiment.

FIG. 9 illustrates a non-limiting example 900 of a planning image 901 received by the target structure tracking system. The planning image 901 is considered a planning image because it includes contours (or segments) 902 around the PTV. In some configurations, the output of the target structure tracking system (e.g., a probability distribution) is transmitted to subsequent algorithms. In some configurations, the probability distribution may be displayed (as a 2D image of a 3D distribution or as a 3D distribution) to a user.

Figure 10:
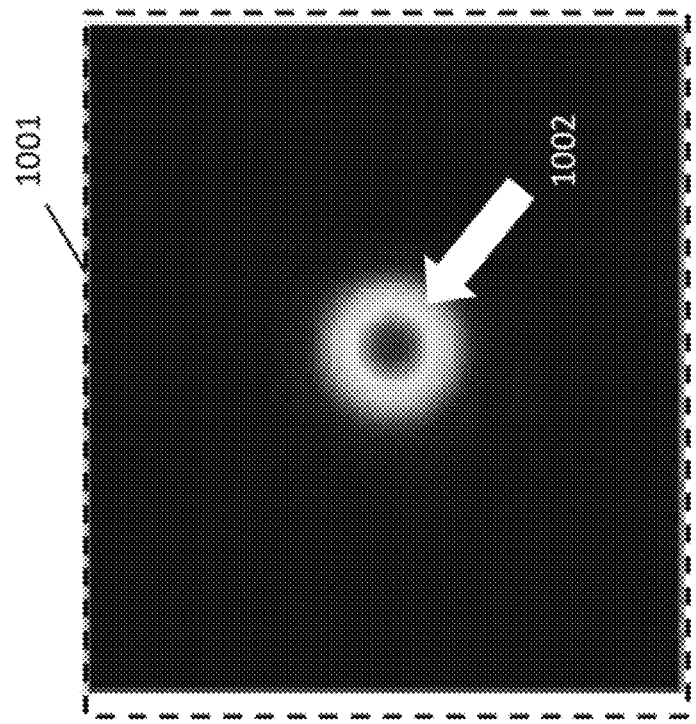
FIG. 10 illustrates a visualized probability distribution of a structure location in a 2D image of a 3D space, according to an embodiment.

FIG. 10 illustrates a non-limiting visual example 1000 of a probability distribution of a structure location in a 2D image of a 3D space, according to an embodiment. In this non-limiting example 1000, the target structure tracking system uses the methods described herein to determine the probability of the segmented target structure (e.g., 902 in FIG. 9) occurring at a position in the patient's anatomy in 3D space. The visualized probability distribution 1001 indicates the probability of the target structure being at a position in 3D space using colors, visual patterns (e.g., cross hatch patterns), or other identifiers. As shown, the target structure tracking system has determined that the target structure is likely to be located at the location 1002.

Figure 4:
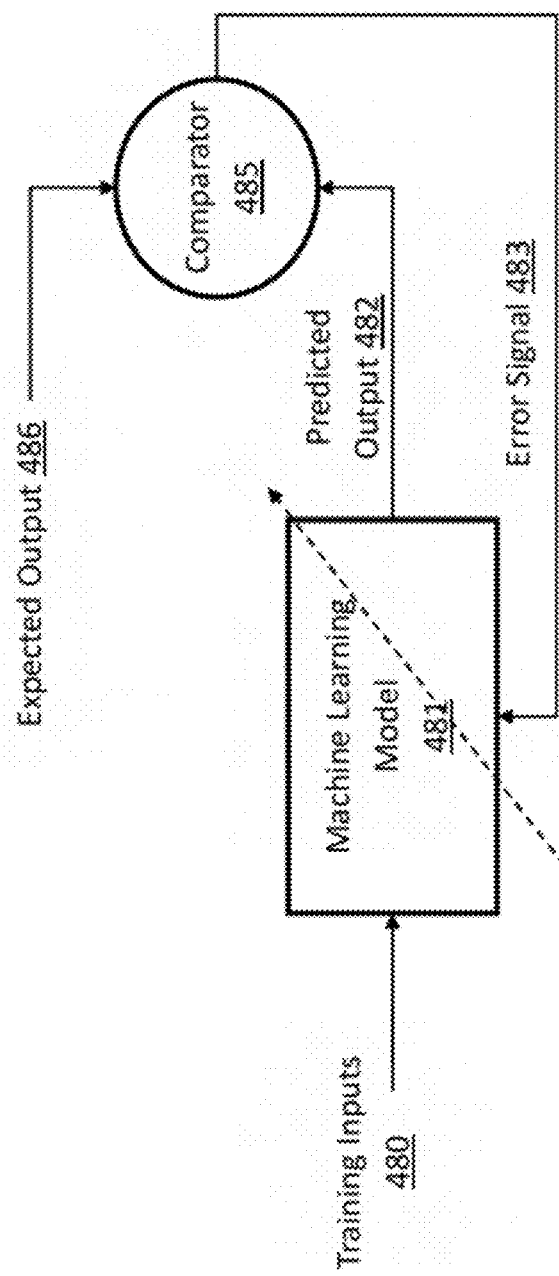
FIG. 4 illustrates training a model using supervised learning, according to an embodiment.

FIG. 4 illustrates training a machine learning model 400 using supervised learning, according to an embodiment. Supervised learning is a method of training a machine learning model given input-output pairs. An input-output pair is an input with an associated labeled output (e.g., an expected output).

The analytics server may train the machine learning model 400 using supervised learning using training inputs 480 (e.g., training projections data, feature maps associated with the training projection data, training simulation images, training segments, or training 3D space data), predicted outputs 482 (e.g., calculated relevant projection features, predicted template image, predicted 3D image, predicted projection data, or a probability distribution of template image in 3D space, predicted contour data, predicted planning image), and expected outputs 486 (e.g., labels associated with relevant projection features, labels associated with template images, labels associated with 3D space data, actual 3D images, actual projection data, or locations of structures in 3D space, actual contour data, actual planning image). The analytics server may receive the input-output pairs from any of the data repositories. The machine learning model 481 may be trained based on data generally and/or granular data (e.g., data based on a specific patient) such that the model may be trained specific to a particular patient.

The analytics server may feed the training inputs 480 such as training simulation images, training segments and training projection data into the target structure tracking system. In some configurations, only training simulation images and training projection data are used as training inputs 480. That is, the analytics server may train a segmentation model (e.g., 320 in FIG. 3) in the target structure tracking system. The analytics server may train the target structure tracking system based on the structures to be tracked in the 3D image (e.g., one structure vs several structures) and/or the type of input (e.g., multi-channel inputs based on stereo projection data vs single channel inputs).

The end-to-end target structure tracking system may be represented as machine learning model 481. The end-to-end target structure tracking system may use the training inputs 480 to generate a probability distribution of a template image in 3D space (e.g., predicted output 482), representing the analytics server tracking the template structure in 3D space, by applying the current state of the target structure tracking system on the training data (e.g., simulation (or planning images) training segments and training projection data). The analytics server may use a comparator 485 to compare the location of the structure in 3D space (e.g., expected output 486) against the predicted output 482 generated by the current state of the system to determine an amount of error or differences.

Training the end-to-end target structure tracking system may include pre-training neural networks or other machine learning models to achieve converge training the end-to-end target structure tracking system. For instance, the analytics server may train or pre-train each machine learning model in the end-to-end target structure tracking system prior to the end-to-end target structure tracking system being trained and/or used. For example, the analytics server may feed the training inputs 480 such as the training projection data into a neural network, such as a feature extractor model (e.g., feature extractor model 304 in FIG. 3). In some configurations, the analytics server may feed historic data into the neural network. The neural network may be represented by the machine learning model 481. The analytics server may use the neural network to calculate relevant projection features (e.g., predicted output 482) by applying the current state of the neural network on the training projections. The analytics server may use the comparator 485 to compare the label associated with the relevant feature projections (e.g., expected output 486 such as edge enhancement at particular areas on the projection) against the predicted output 482 calculated by the current state of the neural network to determine the amount of error or differences.

The analytics server may also feed the training inputs 480 such as training simulation images and training segments into a neural network, such as a template extractor model (e.g., template extractor model 314 in FIG. 3). The neural network may be represented by the machine learning model 481. The analytics server may use the neural network to calculate predicted template images (e.g., predicted output 482) by applying the current state of the neural network on the training simulation images and the training segments. The analytics server may use the comparator 485 to compare the label associated with the template image (e.g., expected output 486) against the predicted output 482 calculated by the current state of the neural network to determine the amount of error or differences.

The analytics server may also feed the training inputs 480 such as a feature map associated with training projection data into a neural network, such as a 3D reconstruction model (e.g., 3D reconstruction model 306 in FIG. 3). The neural network may be represented by the machine learning model 481. The analytics server may use the neural network to generate 3D space data (e.g., predicted output 482) by applying the current state of the neural network on the training projections. The analytics server may use the comparator 485 to compare the label associated with the 3D space data (e.g., expected output 486) against the predicted output 482 calculated by the current state of the neural network to determine the amount of error or differences.

The analytics server may also feed the training inputs 480 such as the training 3D space data into a neural network (such as a recurrent neural network, a LSTM, and the like). The neural network may be a machine learning with memory model (e.g., machine learning with memory model 308 in FIG. 3). The neural network may be represented by the machine learning model 481. The analytics server may use the neural network to sequence 3D image data. The analytics server will apply the current state of the neural network to the training 3D space data and hidden states (e.g., historic 3D space data and/or historic 3D volumetric data) to predict a 3D image (e.g., predicted output 482). The analytics server may use the comparator 485 to compare an actual 3D image (e.g., expected output 486) against the predicted output 482 calculated by the current state of the neural network to determine the amount of error or differences.

The analytics server may also feed the training inputs 480 such as the training 3D space data into a neural network, such as a forward projection model (e.g., forward projection model 318 in FIG. 3). The neural network may be represented by the machine learning model 481. The analytics server may use the neural network to predict projection data (e.g., predicted output 482, which may be 1D or 2D) by applying the current state of the neural network on the 3D space data. The analytics server may use the comparator 485 to compare the actual projection data (e.g., expected output 486, which may be 1D or 2D) against the predicted projection data generated by the current state of the neural network to determine the amount of error or differences.

The analytics server may also feed the training inputs 480 such as the training simulation images into a neural network, such as a segmentation model (e.g., segmentation model 320 in FIG. 3). The neural network may be represented by the machine learning model 481. The analytics server may use the neural network to predict contour data (e.g., predicted output 482) by applying the current state of the neural network on the training simulation image. The analytics server may use the comparator 485 to compare the actual contour data (e.g., expected output 486) against the predicted contour data generated by the current state of the neural network to determine the amount of error or differences.

Additionally, or alternatively, the analytics server may use the neural network to predict a planning image (e.g., predicted output 482) by applying the current state of the neural network on the training simulation image. The analytics server may use the comparator 485 to compare the actual planning image (e.g., expected output 486) against the predicted planning image generated by the current state of the neural network to determine the amount of error or differences.

During training, the error (represented by error signal 483) that the analytics server computed using the comparator 485, may be used to adjust the weights in the machine learning model 481 such that the machine learning model 481 changes (or learns) over time.

The analytics server may train the end-to-end target structure tracking system (and/or each of the machine learning models in the end-to-end target structure tracking system) using the backpropagation algorithm, for instance. The backpropagation method operates by propagating the error signal 483. The error signal 483 may be calculated each iteration, batch and/or epoch and propagated through all of the algorithmic weights in the machine learning model 481 such that the algorithmic weights adapt based on the amount of error. The error is minimized using a loss function. Non-limiting examples of loss functions may include a function considering the peak-to-sidelobe ratio, the square error function, and/or cross entropy error function.

An example function considering the peak to sidelobe ratio of the probability distribution (e.g., the probability of the reference point of the template image matching each point in 3D space) may be defined as:

$$L(Y,x_0) = a\|\mathrm{argmax}_x Y(x) - x_0\|^2 - S(Y), a \in \mathbb{R}_+, Y(x): \mathbb{N}^3 \to \mathbb{R}$$

In the above equation, Y(x) is a probability of a voxel x being at a reference position $x_0$, a is a weighting constant balancing the peak position errors with respect to a reference position (e.g., the reference position of the template image), and S(Y) is the sidelobe ratio. S(Y) may be defined as:

$$S(Y) = \frac{\max_x Y(x) - E(Y(x) \mid x \in P')}{\sigma(Y(x) \mid x \in P')}$$

The expectation value and standard deviation of the zero-centered normalized cross correlation function Y(x) are calculated outside of the peak-exclusion zone, which is defined as:

$$P = \left\{ x \in \mathbb{N}^3 : \frac{\rho_{TT}(x - \mathrm{argmax}_x Y(x))}{\max_x \rho_{TT}(x)} \geq t, t \in (0, 1) \right\}$$

In the above equation, $\rho_{TT}$ is the autocorrelation of the template image and t is a threshold value for the sidelobe region.

The output of the end-to-end target structure tracking system is a probability distribution with peak probabilities at a highest point of template image detection in the 3D space. That is, the more pronounced the peak, the more accurate the tracking prediction is. The loss function used to optimize the end-to-end target structure tracking system enforces a peak probability at one location in 3D space by penalizing sidelobes that exceed a threshold.

The analytics server may use one or more loss functions during the training of the end-to-end target structure tracking system and/or each of the neural networks. The loss functions for each neural network in the end-to-end target structure tracking system may be the same or different. The introduction of the losses on intermediate levels (e.g., at each of the neural networks) may beneficially smooth the feature space (e.g., the feature map) ingested by each of the neural networks.

The analytics server tunes weighting coefficients of the end-to-end target structure tracking system (or each of the machine learning models in the end-to-end target structure tracking system) to reduce the amount of error, thereby minimizing the differences between (or otherwise converging) the predicted output 482 and the expected output 486. The analytics server may continue to feed the training inputs 480 into the machine learning model 481 until the error determined at the comparator 485 is within a certain threshold (or a threshold number of batches, epochs, or iterations have been reached). The analytics server may subsequently store the trained models in a database.

The analytics server may train the machine learning model 481 using training inputs 480 received from one or more database. For example, the analytics server may receive a training projection and a training simulation image (or patient setup image, planning image), and a label associated with the training projection and training simulation image (or patient setup image, planning image).

The labels may be the location of the 3D PTV (or OAR) position in the patient's anatomy, the orientation of the 3D PTV (or OAR) in the patient's anatomy, a segment of the 3D PTV (or OAR) in the patient's anatomy, or an isolated target structure (e.g., PTV or OAR). The training projections, and training simulation images (or patient setup images and/or planning images), may be historic projection data and historic simulation data respectively, and the labels associated with the training projections and training simulation images (patient setup images, planning images) may have been previously determined by one or more users. The location of the structure in 3D space may be a historic location of the structure in 3D space. For each training projection, the corresponding label(s) may correspond to a sequence of 3D position and/or orientation of a structure (e.g., PTV and/or OAR).

Additionally, or alternatively, the training image may be historic diagnostic images (simulation images, planning images, and/or patient set up images), and the labels associated with the template images (e.g., segments) may have been previously determined by one or more users. Additionally, or alternatively, the training projection data may be historic projection data, and the labels associated with the 3D space data may have been previously determined by one or more reconstruction algorithms. The training 3D space data may be historic 3D space data, and the labels associated with the actual 3D image may be historic 3D images of the patient.

Once trained and validated, the analytics server may employ the target structure tracking system on unknown data (e.g., unlabeled data) during an inference phase to perform template image tracking. The analytics server may store the weights of the target structure tracking system tuned during training to minimize the loss defined by the loss function such that the tuned weights can be used during the inference phase. In an example, during the inference phase, the trained target structure tracking system may operate on simulation images and projection data to automatically generate a probability distribution of the location of a template image (derived from the simulation image) with respect to a 3D image (generated from the projection data).

In addition to training the target structure tracking system (or machine learning models) as discussed above, the analytics server may use user interactions to further train the target structure tracking system (or machine learning models). When the user performs an activity on the electronic platform, the analytics server may track and record details of the user's activity. For instance, when a predicted result is displayed on a user's electronic device, the analytics server may monitor the user's electronic device to identify whether the user has interacted with the predicted results by editing, deleting, accepting, or revising the results. The analytics server may also identify a timestamp of each interaction, such that the analytics server records the frequency of modification, duration of revision/correction.

The analytics server may utilize an application programming interface (API) to monitor the user's activities. The analytics server may use an executable file to monitor the user's electronic device. The analytics server may also monitor the electronic platform displayed on an electronic device via a browser extension executing on the electronic device. The analytics server may monitor multiple electronic devices and various applications executing on the electronic devices. The analytics server may communicate with various electronic devices and monitor the communications between the electronic devices and the various servers executing applications on the electronic devices.

Using the systems and methods described herein, the analytics server can have a formalized approach to generate, optimize, and/or evaluate a probability distribution of a location of a template image in a 3D space in a single automated framework based on various variables, parameters, and settings that depend on the patient and/or the patient's treatment. The systems and methods described herein enable a server or a processor associated with (e.g., located in) a clinic to determine a location of PTV(s) and/or OAR(s) in a patient's body, replacing the need to depend on a technician or doctor's subjective skills and understanding.

Figure 5:
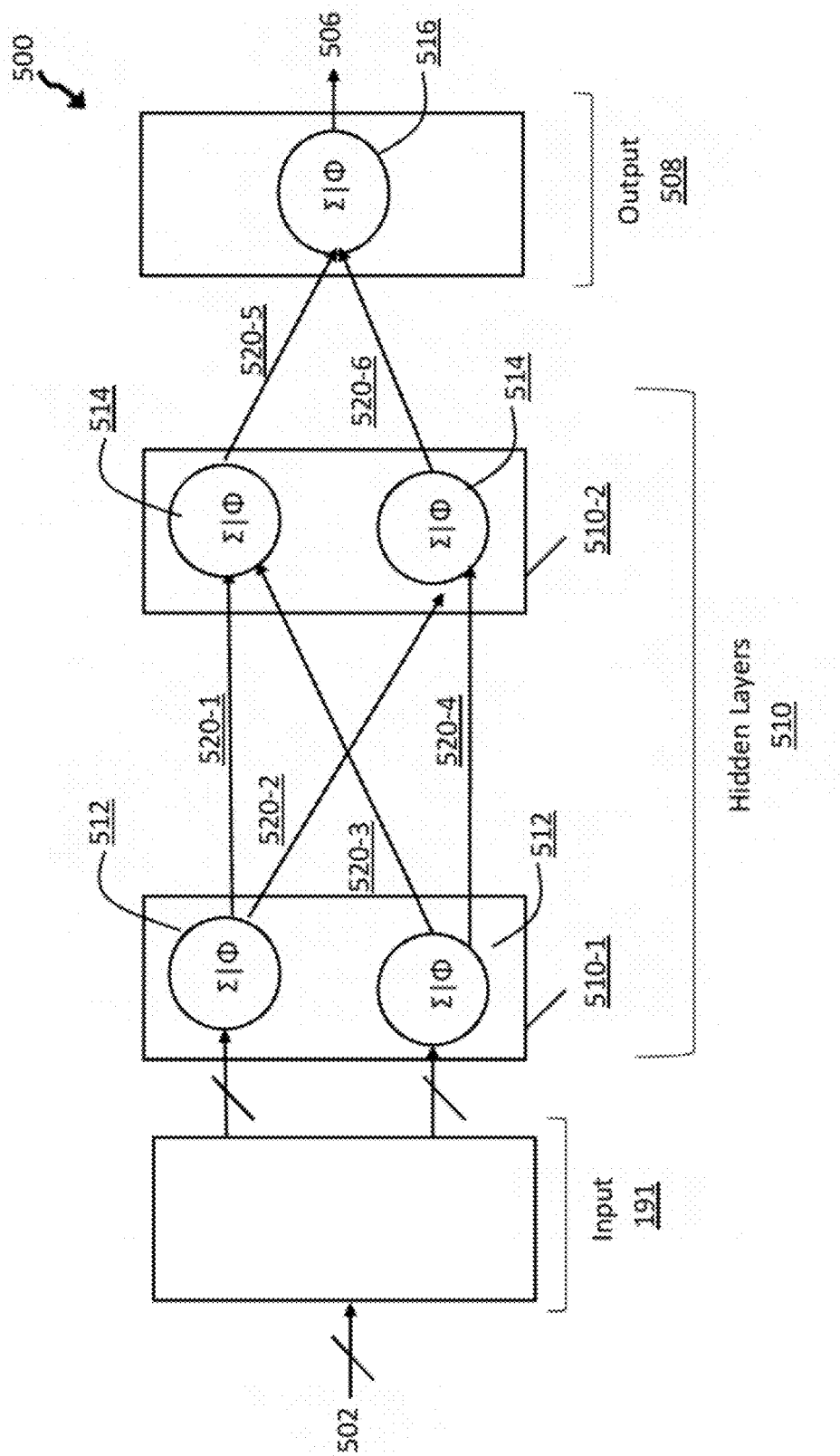
FIG. 5 illustrates a simplified neural network model, according to an embodiment.

FIG. 5 illustrates a simplified neural network model 500, according to an embodiment. The neural network model 500 may include a stack of distinct layers (vertically oriented) that transform a variable number of inputs 502 being ingested by an input layer 504, into an output 506 at the output layer 508. The neural network model 500 may include a number of hidden layers 510 between the input layer 504 and output layer 508. Each hidden layer has a respective number of nodes (512, 514 and 516). In the neural network model 500, the first hidden layer 510-1 has nodes 512, and the second hidden layer 510-2 has nodes 514. The nodes 512 and 514 perform a particular computation and are interconnected to the nodes of adjacent layers (e.g., node 516 in the output layer 508). Each of the nodes (512, 514 and 516) sum up the values from adjacent nodes and apply an activation function, allowing the neural network model 500 to detect nonlinear patterns in the inputs 502. Each of the nodes (512, 514 and 516) are interconnected by weights 520-1, 520-2, 520-3, 520-4, 520-5, 520-6 (collectively referred to as weights 520). Weights 520 are tuned during training to adjust the strength of the node. The adjustment of the strength of the node facilitates the neural network's ability to predict an accurate output 506. When the analytics server trains the target structure tracking system in an end-to-end fashion, the analytics server trains the system from the input layer of the target structure tracking system (the projection data 302 input and simulation image 312 input in FIG. 3), to the output layer of the system (output 316 in FIG. 3).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A computer-implemented method of location prediction using an end-to-end target structure tracking system comprising:
   executing, by a computer, a machine learning model to extract a set of features from imaging projection data associated with a target structure of a patient's anatomy;
   executing, by the computer, a recurrent neural network to obtain three-dimensional feature map data associated with the target structure, the recurrent neural network configured to sequence the imaging projection data using the set of features in three-dimensional space; and
   indicating, by the computer, a probability of a three-dimensional point in a template feature map matching a location of a three-dimensional point in the three-dimensional feature map data, the template feature map comprising the target structure.

2. The computer-implemented method according to claim 1, further comprising:
   receiving, by the computer, segment information associated with the target structure; and
   extracting, by the computer, the template feature map from the three-dimensional simulation image using the segment information and the three-dimensional simulation image.

3. The computer-implemented method according to claim 1, further comprising:
   executing, by the computer, a forward projection algorithm to transform the set of features in three-dimensional space into a set of features in two-dimensional space; and
   feeding, by the computer, the set of features in two-dimensional space into the machine learning model.

4. The computer-implemented method according to claim 1, wherein the computer executes a second machine learning model to transform the extracted set of features into a set of features in three-dimensional space.

5. The computer-implemented method according to claim 1, further comprising:
   determining, by the computer, a deformation field associated with the target structure; and
   indicating, by the computer, the probability of a three-dimensional point in the template feature map, using the deformation field, matching the location of a three-dimensional point in the three-dimensional feature map data.

6. The computer-implemented method according to claim 1, further comprising:
   determining, by the computer, a confidence value based on peaks and sidelobes associated with a probability distribution corresponding to the probability of a three-dimensional point in the template feature map matching a location of a three-dimensional point in the three-dimensional feature map data.

7. The computer-implemented method according to claim 1, further comprising:
   determining, by the computer, a classification for a point in the three-dimensional feature map data based on the probability of a three-dimensional point in the template feature map matching the location of a three-dimensional point in the three-dimensional feature map data satisfying a threshold.

8. The computer-implemented method according to claim 1, wherein the imaging projection data is based on at least one of a stereo projection pair or a projection set generated using a multi-view imaging system.

9. The computer-implemented method according to claim 1, further comprising:
   extracting, by the computer, an additional template feature map from the three-dimensional simulation image associated with an additional target structure;
   comparing, by the computer, the additional template feature map to the three-dimensional feature map data; and
   generating, by the computer, a multi-channel probability distribution indicating the probability of a three-dimensional point in the template feature map matching the location of a three-dimensional point in the three-dimensional feature map data and the probability of a three-dimensional point in the additional template feature map matching the location of a three-dimensional point in the three-dimensional feature map data.

10. The computer-implemented method according to claim 1, wherein comparing the template feature map to the three-dimensional feature map data comprises convolving each point of the template feature map with each point of the three-dimensional feature map data.

11. A system comprising:
    a server comprising a processor and a non-transitory computer-readable medium containing instructions that when executed by the processor causes the processor to perform operations comprising:
       executing a machine learning model to extract a set of features from imaging projection data associated with a target structure of a patient's anatomy;
       executing a recurrent neural network to obtain three-dimensional feature map data associated with the target structure, the recurrent neural network configured to sequence the imaging projection data using the set of features in three-dimensional space; and
       indicating a probability of a three-dimensional point in a template feature map matching a location of a three-dimensional point in the three-dimensional feature map data, the template feature map comprising the target structure.

12. The system according to claim 11, wherein the instructions further cause the server to:
    receive segment information associated with the target structure; and extract the template feature map from the three-dimensional simulation image using the segment information and the three-dimensional simulation image.

13. The system according to claim 11, wherein the instructions further cause the server to:
   execute a forward projection algorithm to transform the set of features in three-dimensional space into a set of features in two-dimensional space; and
   feed the set of features in two-dimensional space into the machine learning model.

14. The system according to claim 11, wherein the computer executes a second machine learning model to transform the extracted set of features into a set of features in three-dimensional space.

15. The system according to claim 11, wherein the instructions further cause the server to:
   determine a deformation field associated with the target structure; and
   indicate the probability of a three-dimensional point in the template feature map, using the deformation field, matching the location of a three-dimensional point in the three-dimensional feature map data.

16. The system according to claim 11, wherein the instructions further cause the server to:
   determine a confidence value based on peaks and sidelobes associated with a probability distribution corresponding to the probability of a three-dimensional point in the template feature map matching a location of a three-dimensional point in the three-dimensional feature map data.

17. The system according to claim 11, wherein the instructions further cause the server to:
   determine a classification for a point in the three-dimensional feature map data based on the probability of a three-dimensional point in the template feature map matching the location of a three-dimensional point in the three-dimensional feature map data satisfying a threshold.

18. The system according to claim 11, wherein the imaging projection data is based on at least one of a stereo projection pair or a projection set generated using a multi-view imaging system.

19. The system according to claim 11, wherein the instructions further cause the server to:
   extract an additional template feature map from the three-dimensional simulation image associated with an additional target structure;
   compare the additional template feature map to the three-dimensional feature map data; and
   generate a multi-channel probability distribution indicating the probability of a three-dimensional point in the template feature map matching the location of a three-dimensional point in the three-dimensional feature map data and the probability of a three-dimensional point in the additional template feature map matching the location of a three-dimensional point in the three-dimensional feature map data.

20. The system according to claim 11, wherein comparing the template feature map to the three-dimensional feature map data comprises convolving each point of the template feature map with each point of the three-dimensional feature map data.

\* \* \* \* \*